United States Patent [19]

Nebashi et al.

[11] Patent Number: 4,999,138

[45] Date of Patent: Mar. 12, 1991

[54] HIGH-DENSITY GRANULAR CONCENTRATED DETERGENT COMPOSITION

[75] Inventors: Tutomu Nebashi; Shinichi Yabe; Nobuyoshi Yamaguchi; Shuichi Takizawa; Fumio Sai, all of Tochigi, Japan

[73] Assignee: Kao Corporation, Tokyo, Japan

[21] Appl. No.: 376,006

[22] Filed: Jul. 6, 1989

[30] Foreign Application Priority Data

Jul. 28, 1988 [JP] Japan ................................ 63-188961

[51] Int. Cl.$^5$ .......................... C11D 3/28; C11D 1/02; C09B 49/02

[52] U.S. Cl. ................................ 252/543; 252/174.14; 252/174.23; 252/542; 8/648

[58] Field of Search .................... 252/542, 543, 174.14, 252/174.23; 8/648

[56] References Cited

U.S. PATENT DOCUMENTS 4,326,971 4/1982 Wixon ................................ 252/542

FOREIGN PATENT DOCUMENTS 2026054 1/1980 United Kingdom .
2028365 3/1980 United Kingdom .
2076011 11/1981 United Kingdom .

*Primary Examiner*—Paul Lieberman
*Assistant Examiner*—Alexander G. Ghyka
*Attorney, Agent, or Firm*—Birch, Stewart, Kolasch & Birch

[57] ABSTRACT

A high density-having, granular, concentrated detergent composition comprises:

(1) 30 to 50 wt. % of an anionic surface active agent,
(2) 40 to 60 wt. % of an inorganic builder,
(3) a fluorescent dye,
(a) 5 to 25 wt. % of potassium salt of an anionic surfactant or 2 to 10 wt. % of potassium carbonate or potassium sulfate,
(b) 0.1 to 3 wt. % of sodium chloride and
(c) 0.2 to 5 wt. % of polyethylene glycol having a molecular weight of 6,000 to 20,000.

3 Claims, No Drawings

HIGH-DENSITY GRANULAR CONCENTRATED DETERGENT COMPOSITION

The present invention relates to a high-density granular concentrated detergent composition in which the color of the detergent particles (hereinafter referred to as "powder color") is improved.

PRIOR ART

Most conventional powdery detergents are low-density products prepared according to the spray-dry method. Recently, for facilitation of transportation of detergents, carrying of detergents by housewives and storage of detergents, the demand for compact high-density detergents is increasing. However, other problems not encountered in low-density detergents arise in high-density detergents because of an increase of the density, and the most serious problem resides in that the solubility is much lower than that of low-density detergents. Various investigations have been made for solving this problem (see, for example, Japanese Patent Laid-Open No. 61511/1973, No. 132093/1983, No. 167398/1987, No. 253699/1987, No. 96698/1985, No. 272300/1986, No. 161898/1987 and No. 246300/1986). The problem of solubility has been solved by these investigations, and the recent diffusion of high-density detergents is striking.

In high-density detergents, the amount of surface active agent is increased over the amount used in conventional low-density detergents while the amount of an inorganic salt is controlled to a necessary and minimum level. However, reduction of the amount of the inorganic salt tends to degrade the powder color. Furthermore in high-density detergents, the amount of a fluorescent dye incorporated therein is larger than in low-density detergents, and this results in degradation of the powder color at high-temperature storage, because the fluorescent dye is readily yellowed and deteriorated by heat or light during preparation or during storage. If the amount of the fluorescent dye incorporated in the detergent is controlled to the same level as in conventional low-density detergents, since the amount of the detergent used for one washing is small, the amount of the fluorescent dye used for one washing is small and the fluorescent whiteness of washed clothing is low. In short, because of the limitations of the composition, the powder color of high-density detergents tends to lower with compared with that of conventional low-density detergents. This tendency is especially conspicuous in high-density detergents prepared according to the spray-dry granulation. method. If the powder color is degraded, the commercial value is lowered and the image o "whiteness of washing finish" in washing of white clothing and the like is lowly evaluated. Therefore, it is necessary to whiten the color of high-density detergents.

SUMMARY OF THE INVENTION

We made research with a view to solving the above-mentioned problem and as the result, it was found that if specific amounts of a potassium salt of an anionic surface active agent or potassium carbonate or potassium sulfate, sodium chloride and a polyethylene glycol having a specific molecular weight are incorporated in a detergent composition, the powder color of a high-density detergent is improved. We have now completed the present invention based on this finding.

The invention provides for a high density, granular, concentrated detergent composition which comprises:

(1) 30 to 50 wt.% of an anionic surface active agent, (2) 40 to 60 wt.% of an inorganic builder, (3) a fluorescent dye, (a) 5 to 25 wt.% of a potassium salt of an anionic surfactant or 2 to 10 wt.% of potassium carbonate or potassium sulfate, (b) 0.1 to 3 wt.% of sodium chloride and (c) 0.2 to 5 wt.% of polyethylene glycol having a molecular weight of 6,000 to 20,000.

It is preferable that the composition comprises 0.1 to 0.7 wt.% of the fluorescent.

It is preferred that the fluorescent is a mixture of the (3*a*) and (3*b*) and a weight ratio of (3*a*) to (3*b*) in the range of ¼ to 4/1.

The granules of the invention may be obtained by the spray-drying method.

More specifically, in accordance with the present invention, there is provided a high-density granular concentrated detergent composition comprising 30 to 50% by weight of an anionic surface active agent, 40 to 60% by weight of an inorganic builder and a fluorescent dye, characterized in that (a) a potassium salt of the anionic surface active agent is contained in an amount of 5 to 25% by weight, or potassium carbonate or potassium sulfate is contained in an amount of 2 to 10% by weight based on the detergent composition, (b) sodium chloride is contained in an amount of 0.1 to 3% by weight based on the detergent composition, and (c) a polyethylene glycol having a molecular weight of 6000 to 20000 is contained in an amount of 0.2 to 5% by weight based on the detergent composition.

As the anionic surface active agent used in the present invention, there can be mentioned alkyl benzene-sulfonate salts, alkyl sulfate salts, alkyl ethoxysulfonate salts, paraffin-sulfonate salts, α-olefin-sulfonate salts, c-sulfofatty acid ester salts and higher fatty acid salts. The anionic surface active agent is incorporated in an amount of 30 to 50% by weight in the composition.

In the present invention, the presence of potassium is indispensable, and potassium is supplied as the counter ion of the anionic surface active agent or as potassium carbonate or potassium sulfate. If potassium is supplied as the counter ion of the anionic surface active agent, the amount incorporated is 5 to 25% by weight, preferably 5 to 15% by weight, especially 5 to 10% by weight, based on the composition. The remaining 5 to 45% by weight of the anionic surface active agent is a sodium salt. Although the type of anionic surface agent to be used in the form of a potassium salt is not particularly critical, since an alkyl benzene-sulfonate salt is used as the main activator in an ordinary detergent, it is preferred that a part of this activator be incorporated in the form of a potassium salt. In the case where potassium is supplied in the form of potassium carbonate or potassium sulfate, the potassium salt is incorporated in an amount of 2 to 10% by weight, preferably 2 to 6% by weight, especially preferably 3 to 5% by weight, in the composition.

The second indispensable component of the present invention is sodium chloride, and sodium chloride is incorporated in an amount of 0.1 to 3% by weight, preferably 0.1 to 2% by weight, in the composition.

In the present invention, in addition to the above-mentioned components, a polyethylene glycol having an average molecular weight of 6000 to 20000, preferably 8000 to 15000, is incorporated in an amount of 0.2 to 5% by weight, preferably 1 to 3% by weight.

Although the reason why the powder color of the high-density detergent is improved by incorporating the above-mentioned three components as indispensable components in the above-mentioned specific amounts has not been elucidated, it is construed that the powder color-improving effect is probably attained because the fluorescent dye is sufficiently dispersed in the powdery detergent and deterioration of the fluorescent dye is controlled by the catalytic action.

As the inorganic builder to be incorporated in the high-density detergent composition of the present invention beside the above-mentioned indispensable inorganic salts, there can be mentioned inorganic builders such as sodium silicate, sodium carbonate, sodium sulfate and zeolites. The inorganic builder is incorporated in an amount of 40 to 60% by weight in the composition. From the viewpoint of the solubility, it is preferred that among the inorganic builders, sodium carbonate and sodium sulfate be incorporated in a total amount of up to 20% by weight, especially up to 15% by weight.

A fluorescent dye is incorporated in the high-density detergent composition of the present invention. It is preferred that the fluorescent dye is incorporated in an amount of 0.1 to 0.7% by weight in the composition. In order to obtain a good dyeing affinity with various clothing materials, it is preferred that (3a) a compound represented by the following formula:

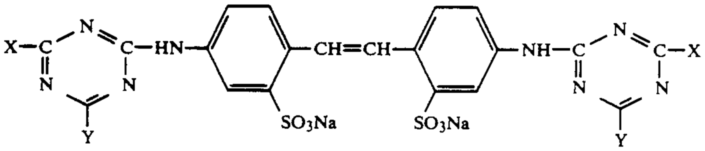

(3a)

wherein X stands for

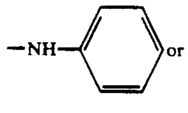

or

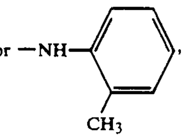

, and Y stands for

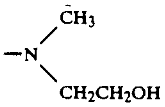

or

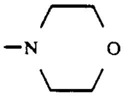

and (3*b*) a compound represented by the following formula:

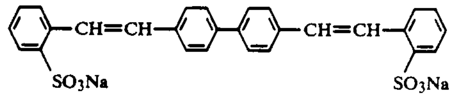

(3b)

be used in combination as the fluorescent dye.

In general, when these two fluorescent dyes are used in combination, the powder color during high-temperature storage is degraded as compared with the powder color attained in the case where any of the above-mentioned fluorescent dyes is used singly, but in the present invention, the combined use of the fluorescent dyes is preferred.

In addition to the foregoing indispensable components, other components, for example; non-ionic surface active agents such as polyoxyethylene alkyl ethers, higher fatty acid alkanolamides and polyoxyethylene alkyl esters, cationic surface active agents such as quaternary ammonium salts, organic builders such as nitrilotriacetic acid salts, ethylenediamine tetraacetic acid salts and citric acid salts, antiredeposition agents such as carboxymethyl cellulose and polyacrylic acid salts, enzymes such as protease, cellulase, amylase and lipase, reducing agents such as fulfurous acid salts, bleaching agents such as sodium percarbonate and sodium perborate, and other customary detergent additives such as perfumes can be incorporated into the high-density detergent composition of the present invention according to need.

High-density granular agents are ordinarily prepared according to the method in which detergent components are intimately kneaded and mixed by a kneader or the like and the mixture is disintegrated and the method in which a powder obtained by spray-drying a slurry of detergent components is granulated. Any of these methods can be adopted for preparing the high-density detergent of the present invention, but the effect of the present invention is prominent when the spray-dray granulation method in which a high temperature is applied is adopted.

EFFECT OF THE INVENTION

The high-density granular concentrated detergent composition of the present invention shows a good powder color just after the preparation, and even after the composition is stored at a high temperature, the powder color is not degraded. This is an excellent effect attained by the present invention.

EXAMPLE

The present invention will now be described in detail with reference to the following example that by no means limits the scope of the invention.

EXAMPLE 1

(1) Preparation of Detergent

A slurry having a water content of 50% by weight was prepared by using detergent components shown in Table 1 except components for which subsequent dry blending was preferred, such as 10% by weight of a zeolite and a small amount of an enzyme, and a powder obtained by spray-drying the slurry was charged in a high-speed mixer (stirring and tumbling granulator supplied by Fukae Kogyo Kabushiki Kaisha). Then, 5% by weight of the zeolite wetted with 1% by weight of water was added to the powder, and the resulting mixture was granulated. Then, 3% by weight of the zeolite was added to the granulated mixture, and the granulation was carried out. Then, the obtained particles were dry-blended with remaining 2% by weight of the zeolite and small amount of additives to obtain a high-density granular concentrated detergent having a bulk density of 0.70 to 0.80g/cm². Water in the water-wetted zeolite added to the granulation acted as the granulation binder, and the zeolite acted as the carrier of that water as the granulation binder and also acted as a granulation assistant for controlling formation of coarse particles together with the subsequently added zeolite. The zeolite to be finally dry-blended was incorporated for improving the flowability and anti-blocking property of the detergent particles. Each zeolite was used in the form of a fine powder.

(2) Evaluation of Powder Color

With respect to the as-prepared detergent and the detergent obtained after 1.5kg of the detergent was filled in a detergent vessel having a volume of 2.5 liters and stored at 30° C. or 40° C. or on the roof (exposed to sun light) for 20 days, the b value was measured by a color difference meter (Model 1001DP supplied by Nippon Denshoku Kogyo Kabushiki Kaisha). The smaller the b value, the whiter the powder of the detergent.

-continued

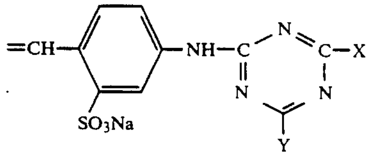

wherein X stands for 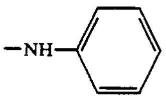 or 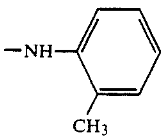, and Y stand for 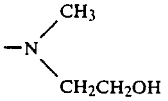 or 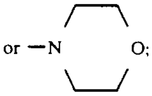; and (3b)

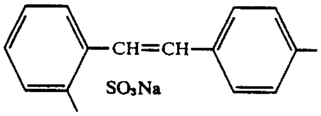

TABLE 1

| | Detergent Composition No. | 1*1 | 2*1 | 3*1 | 4 | 5 | 6*1 | 7 | 8 | 9*1 | 10*1 |
|---|---|---|---|---|---|---|---|---|---|---|---|
| Detergent components (% by weight) | LAS*2-Na salt | 26.0 | 18.0 | 23.0 | 19.0 | 16.0 | 26.0 | 26.0 | 26.0 | 11.0 | 26.0 |
| | LAS*2-K salt | — | 8.0 | 3.0 | 6.0 | 10.0 | — | — | — | 15.0 | — |
| | AS-Na salt*3 | 8.0 | 8.0 | 8.0 | 8.0 | 8.0 | 8.0 | 8.0 | 8.0 | 8.0 | 8.0 |
| | soap*4 | 2.4 | 2.4 | 2.4 | 2.4 | 2.4 | 2.4 | 2.4 | 2.4 | 2.4 | 2.4 |
| | non-ionic surfactant5 | 2.4 | 2.4 | 2.4 | 2.4 | 2.4 | 2.4 | 2.4 | 2.4 | 2.4 | 2.4 |
| | zeolite | 24.0 | 24.0 | 24.0 | 24.0 | 24.0 | 24.0 | 24.0 | 24.0 | 24.0 | 24.0 |
| | sodium carbonate | 9.0 | 9.0 | 9.0 | 9.0 | 9.0 | 8.0 | 8.0 | 8.0 | 9.0 | 8.0 |
| | potassium carbonate | — | — | — | — | — | 1.0 | 3.0 | 5.0 | — | 6.0 |
| | sodium silicate No. 2 | 13.0 | 13.0 | 13.0 | 13.0 | 13.0 | 13.0 | 11.0 | 9.0 | 13.0 | 8.0 |
| | sodium sulfate | 3.5 | 3.5 | 3.5 | 2.5 | 3.0 | 1.5 | 2.5 | 3.0 | 2.5 | 2.5 |
| | sodium chloride | — | — | — | 1.0 | 0.5 | 2.0 | 1.0 | 0.5 | 1.0 | 1.0 |
| | polyethylene glycol MW 4000 | — | — | — | — | — | — | — | — | 3.0 | 3.0 |
| | polyethylene glycol MW 13000 | 3.0 | 3.0 | 3.0 | 3.0 | 3.0 | 3.0 | 3.0 | 3.0 | — | — |
| | enzyme | 2.2 | 2.2 | 2.2 | 2.2 | 2.2 | 2.2 | 2.2 | 2.2 | 2.2 | 2.2 |
| | fluorescent dye*6 | 0.5 | 0.5 | 0.5 | 0.5 | 0.5 | 0.5 | 0.5 | 0.5 | 0.5 | 0.5 |
| | water | 6.0 | 6.0 | 6.0 | 6.0 | 6.0 | 6.0 | 6.0 | 6.0 | 6.0 | 6.0 |
| Powder color (b value) | just after preparation | 4.0 | 1.0 | 3.5 | 0.7 | 0.5 | 2.5 | 0.8 | 0.5 | 0.5 | 4.0 |
| | 30° C. × 20 days | 4.5 | 4.0 | 4.0 | 0.9 | 0.7 | 3.5 | 1.0 | 0.7 | 3.5 | 4.5 |
| | 40° C. × 20 days | 5.0 | 4.5 | 4.5 | 1.0 | 0.8 | 4.0 | 1.2 | 0.8 | 4.0 | 5.0 |
| | on the roof (exposure to sunlight) × 20 days | 5.2 | 4.5 | 4.7 | 1.0 | 0.8 | 4.5 | 1.2 | 1.0 | 4.5 | 5.2 |

Note
*1comparative product
*2LAS = linear alkyl ($C_{12-13}$) benzene-sulfonate
*3AS-Na salt = sodium alkyl ($C_{14-15}$) sulfate
*4soap = sodium salt of beef-tallow ($C_{16-18}$) fatty acid
*5non-ionic surfactant: polyoxyethylene ($\bar{P}$ = 13) alkyl($C_{12-13}$) ether
*6fluorescent dye = (a)/(b) = 1/1 weight ratio, X = 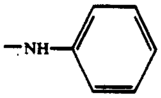 and Y = 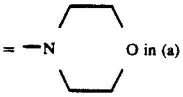 in (a)

We claim:
1.

(3a)

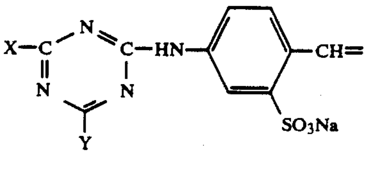

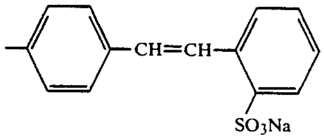;

2. The composition as claimed in claim 3, wherein the weight ratio of (3a) and (3b) is the range of from ¼ to 4/1.

3. The composition as claimed in claim 1, wherein said granules are obtained by a spray-drying method.

* * * * *